US012742496B2

(12) United States Patent
Miller et al.

(10) Patent No.: US 12,742,496 B2
(45) Date of Patent: Sep. 22, 2026

(54) GEARBOX ASSEMBLY HAVING A SEGMENTED SCAVENGE GUTTER FOR A TURBINE ENGINE

(71) Applicant: General Electric Company, Evendale, OH (US)

(72) Inventors: Brandon W. Miller, Middletown, OH (US); Paul Pezzi, Cincinnati, OH (US); Arda Unsal, Istanbul (TR); Andrew Hudecki, Milford, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/817,510

(22) Filed: Aug. 28, 2024

(65) Prior Publication Data

US 2026/0063196 A1 Mar. 5, 2026

(51) Int. Cl.
*F16H 57/04* (2010.01)
*F01D 25/18* (2006.01)

(52) U.S. Cl.
CPC ......... *F16H 57/0423* (2013.01); *F01D 25/18* (2013.01); *F05D 2260/98* (2013.01)

(58) Field of Classification Search
CPC ... F16H 57/0423; F01D 25/18; F01D 2260/98
See application file for complete search history.

(56) References Cited

U.S. PATENT DOCUMENTS 9,976,444 B2 5/2018 NguyenLoc et al.
10,082,105 B2 * 9/2018 McCune ................ F16H 57/04
10,119,465 B2 * 11/2018 Sheridan ............... F16H 1/2818
10,174,635 B2 1/2019 Walker et al.
10,247,020 B2 4/2019 McCune
10,281,025 B2 * 5/2019 Sheridan .................. F02C 3/04
10,287,915 B2 5/2019 McCune
11,008,942 B2 5/2021 Jacquemard et al.
(Continued)

FOREIGN PATENT DOCUMENTS

FR 3127024 A1 3/2023
FR 3127025 A1 3/2023
(Continued)

OTHER PUBLICATIONS

Manzoni et al., U.S. Appl. No. 18/510,014, filed Nov. 15, 2023.

*Primary Examiner* — Minh Truong
(74) *Attorney, Agent, or Firm* — Venable LLP; Michele V. Frank

(57) ABSTRACT

A gearbox assembly for a turbine engine. The gearbox assembly includes a gearbox having a plurality of gears, and a scavenge gutter radially outward of the gearbox and mounted to a fan frame flange of a fan frame of the turbine engine, the scavenge gutter being configured to collect lubricant that is ejected by the plurality of gears of the gearbox during rotation of the plurality of gears. An interface between the fan frame flange and the scavenge gutter is located at a first radial distance R1 relative to a longitudinal centerline axis of the turbine engine and the scavenge gutter is located at a second radial distance R2 relative to the longitudinal centerline axis. The second radial distance R2 is greater than the first radial distance R1. The scavenge gutter is segmented and includes a plurality of sector portions joined together to form the scavenge gutter.

9 Claims, 10 Drawing Sheets

(56) References Cited

U.S. PATENT DOCUMENTS

| | | | | |
|---|---|---|---|---|
| 11,073,044 | B2 | 7/2021 | DiBenedetto | |
| 11,125,318 | B2 * | 9/2021 | Chevillot | F16H 57/0456 |
| 11,293,307 | B2 | 4/2022 | Anglin et al. | |
| 11,396,941 | B2 | 7/2022 | Pennacino et al. | |
| 12,065,976 | B2 * | 8/2024 | Pennacino | F02C 7/06 |
| 2015/0377066 | A1 * | 12/2015 | Duong | F16H 57/0436 418/229 |
| 2024/0254892 | A1 * | 8/2024 | Mouly | F02C 7/06 |

FOREIGN PATENT DOCUMENTS

| | | | |
|---|---|---|---|
| FR | 3129436 | A1 | 5/2023 |
| FR | 3129690 | A1 | 6/2023 |
| FR | 3130747 | A1 | 6/2023 |
| FR | 3130875 | A1 | 6/2023 |

* cited by examiner

GEARBOX ASSEMBLY HAVING A SEGMENTED SCAVENGE GUTTER FOR A TURBINE ENGINE

TECHNICAL FIELD

The present disclosure relates generally to gearbox assemblies for turbine engines.

BACKGROUND

Turbine engines, for example, for an aircraft, generally include a fan and a turbo-engine arranged in flow communication with one another. Some turbine engines include speed sensors for sensing a rotational speed of one or more rotating components of the turbine engine.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, or structurally similar elements.

DETAILED DESCRIPTION

Figure 1:
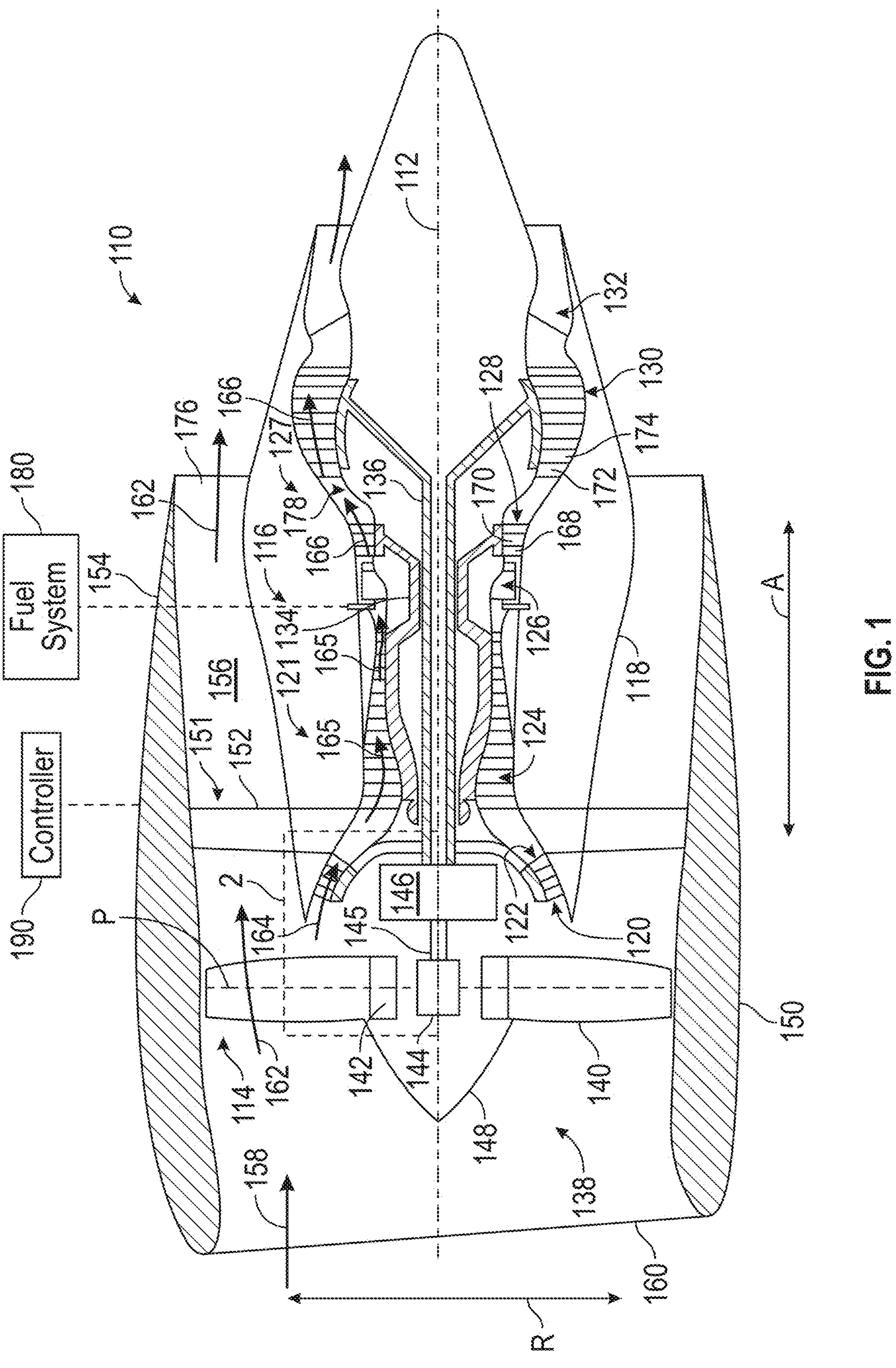
FIG. 1 is a schematic cross-sectional view of a turbine engine, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the disclosure as claimed.

Various embodiments of the present disclosure are discussed in detail below. While specific embodiments are discussed, this is done for illustration purposes only. A person skilled in the relevant art will recognize that other components and configurations may be used without departing from the present disclosure.

As used herein, the terms "first," "second," "third," etc., may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

The present disclosure provides a segmented scavenge gutter for a gearbox assembly, in a turbine engine. An epicyclical gearbox centrifuges and ejects a great amount of lubricant (e.g., oil) outwardly, especially, in a star gearbox configuration. A lubricant collector, often called a scavenge gutter, is positioned radially outward of a gearbox having plurality of gears of the gearbox assembly to gather and to route the lubricant out of a gearbox cavity of the gearbox into the scavenge gutter. The scavenge gutter is the outer most portion of the gearbox assembly, and therefore may very likely set the airflow path minimum radius allowable through the fan frame into the turbo-engine of the turbine engine. This may impact the fan hub radius ratio that may impact fan aerodynamic efficiency and by lowering fan diameter of the overall propulsion system. By segmenting the scavenge gutter, however, it is possible to package the airflow path more tightly to the gearbox of the gearbox assembly, thus improving fan aerodynamic efficiency, lowering fan diameter, and improving booster performance (due to booster inlet radius ratio). The booster inlet radius ratio is the radius of the first stage of booster or LP compressor rotor hub leading edge radius to the LP compressor rotor tip leading edge radius. The booster inlet radius ratio provides a measure of how tightly packaged is the gearbox. If the gearbox is large the booster must move out radially to accommodate the gearbox. Packaging the airflow path more tightly to the gearbox can be achieved by any number of gutter segments that may be installed into the fan frame of the turbine engine prior to the gearbox of the gearbox assembly being installed into the fan frame.

Referring now to the drawings, FIG. 1 is a schematic cross-sectional view of a turbine engine 110, taken along a longitudinal centerline axis 112 of the turbine engine 110, according to an embodiment of the present disclosure. As shown in FIG. 1, the turbine engine 110 defines an axial direction A (extending parallel to the longitudinal centerline axis 112) and a radial direction R that is normal to the axial direction A. In general, the turbine engine 110 includes a fan assembly 114 and a turbo-engine 116 disposed downstream from the fan assembly 114.

The turbo-engine 116 includes, in serial flow relationship, a compressor section 121, a combustor 126, and a turbine section 127. The turbo-engine 116 depicted is substantially enclosed within a core cowl 118 (e.g., an outer casing) that is substantially tubular and defines a core inlet 120 having an annular shape that is annular about the longitudinal centerline axis 112. As schematically shown in FIG. 1, the compressor section 121 includes a booster or a low-pressure (LP) compressor 122 followed downstream by a high-pressure (HP) compressor 124. The combustor 126 is downstream of the compressor section 121. The turbine section 127 is downstream of the combustor 126 and includes a high-pressure (HP) turbine 128 followed downstream by a low-pressure (LP) turbine 130, also referred to as a power turbine. The turbo-engine 116 also includes a core exhaust nozzle 132 that is downstream of the turbine section 127. The turbo-engine 116 further includes a high-pressure (HP) shaft 134, also referred to as a high-speed shaft, that drivingly connects the HP turbine 128 to the HP compressor 124. The HP turbine 128 and the HP compressor 124 rotate in unison through the HP shaft 134. The turbo-engine 116 includes a low-pressure (LP) shaft 136, also referred to as a low-speed shaft, that drivingly connects the LP turbine 130 to the LP compressor 122. The LP turbine 130 and the LP compressor 122 rotate in unison through the LP shaft 136. The compressor section 121, the combustor 126, the turbine section 127, and the core exhaust nozzle 132 together define a core air flow path.

For the embodiment depicted in FIG. 1, the fan assembly 114 includes a fan 138 (e.g., a variable pitch fan) having a plurality of fan blades 140 coupled to a fan disk 142 in a spaced apart manner. As depicted in FIG. 1, the fan blades 140 extend outwardly from the fan disk 142 generally along the radial direction R. Each fan blade 140 is rotatable relative to the fan disk 142 about a pitch axis P by virtue of the fan blades 140 being operatively coupled to a fan actuation system 144 configured to collectively vary the pitch of the fan blades 140 in unison, as detailed further below. The fan actuation system 144 is disposed within a fan hub 148. The fan blades 140, the fan disk 142, and the fan actuation system 144 are together rotatable about the longitudinal centerline axis 112 via a fan shaft 145 that is powered by the LP shaft 136 across a power gearbox, also referred to as a gearbox assembly 146 (i.e., an integral drive configuration).

The gearbox assembly 146 is shown schematically in FIG. 1. The gearbox assembly 146 includes a plurality of gears for adjusting the rotational speed of the fan shaft 145 and, thus, the fan 138 relative to the LP shaft 136. The gearbox assembly 146 has a gear ratio in a range of 3.5:1 to 5:1 for a ducted engine (e.g., the turbine engine 110). The LP shaft 136, the gearbox assembly 146, and the fan shaft 145 are disposed in an in-line configuration such that the LP shaft 136, the gearbox assembly 146, and the fan shaft 145 are coaxial and are each disposed about the longitudinal centerline axis 112. The in-line configuration helps to reduce the space needed within the turbine engine 110 for the gearbox assembly 146 and allows a greater amount of torque to be transferred from the LP shaft 136 to the fan shaft 145 through the gearbox assembly 146 as compared to turboprop engines in which the gearbox assembly 146 is typically disposed in a stepped configuration and is not coaxial with the LP shaft and the fan shaft.

Referring still to the exemplary embodiment of FIG. 1, the fan disk 142 is covered by the fan hub 148 that rotates and is aerodynamically contoured to promote an airflow through the plurality of fan blades 140. In addition, the fan assembly 114 includes an annular fan casing or a nacelle 150 that circumferentially surrounds the fan 138 and at least a portion of the turbo-engine 116. In this way, the turbine engine 110 is a ducted engine. The nacelle 150 is supported relative to the turbo-engine 116 by a fan frame 151 having a plurality of fan guide vanes 152, also referred to as outlet guide vanes, that are spaced circumferentially about the nacelle 150. Moreover, a downstream section 154 of the nacelle 150 extends over an outer portion of the turbo-engine 116 to define a bypass airflow passage 156 therebetween.

During operation of the turbine engine 110, a volume of air 158 enters the turbine engine 110 through an inlet 160 of the nacelle 150 or the fan assembly 114. As the volume of air 158 passes across the fan blades 140, a first portion of air, referred to as bypass air 162, is directed or routed into the bypass airflow passage 156, and a second portion of air, referred to as core air 164, is directed or is routed into the upstream section of the core air flow path, or, more specifically, into the core inlet 120 of the LP compressor 122. The ratio between the bypass air 162 and the core air 164 is commonly known as a bypass ratio. The pressure of the core air 164 is then increased by the LP compressor 122 to produce compressed air 165, and the compressed air 165 is routed through the HP compressor 124 and into the combustor 126, where the compressed air 165 is mixed with fuel and burned to generate combustion gases 166.

The combustion gases 166 are routed into the HP turbine 128 and expanded through the HP turbine 128 where a first portion of thermal energy and kinetic energy from the combustion gases 166 is extracted via one or more stages of HP turbine stator vanes 168 that are coupled to the core cowl 118 and HP turbine rotor blades 170 that are coupled to the HP shaft 134. This causes the HP shaft 134 to rotate, thereby supporting operation of the HP compressor 124 (e.g., a self-sustaining cycle). In this way, the combustion gases 166 do work in the HP turbine 128 to cause the HP turbine rotor blades 170 (and the HP shaft 134) to rotate at a sufficient rate to maintain the compression ratio of the HP compressor 124 (e.g., a self-sustaining cycle). The combustion gases 166 are then routed into the LP turbine 130 and expanded through the LP turbine 130. Here, a second portion of the thermal energy and the kinetic energy is extracted from the combustion gases 166 via one or more stages of LP turbine stator vanes 172 that are coupled to the core cowl 118 and LP turbine rotor blades 174 that are coupled to the LP shaft 136. This causes the LP shaft 136 to rotate, thereby supporting operation of the LP compressor 122 and rotation of the fan 138 via the gearbox assembly 146 (e.g., a self-sustaining cycle). In this way, the combustion gases 166 do work in the LP turbine 130 to cause the LP turbine blades 174 (and the LP shaft 136) to rotate.

The combustion gases 166 are subsequently routed through the core exhaust nozzle 132 of the turbo-engine 116 to provide propulsive thrust. Simultaneously, the bypass air 162 is directed through the bypass airflow passage 156 before being exhausted from a fan exhaust nozzle 176 of the turbine engine 110, also providing propulsive thrust. The HP turbine 128, the LP turbine 130, and the core exhaust nozzle 132 at least partially define a hot gas path 178 for routing the combustion gases 166 through the turbo-engine 116.

The turbine engine 110 includes a fuel system 180 for providing the fuel to the combustor 126. For example, the fuel system 180 can include a fuel tank for storing the fuel, one or more fuel lines in flow communication with the fuel tank and the combustor 126, and a fuel pump for delivering the fuel from the fuel tank to the combustor 126 through the one or more fuel lines.

The turbine engine 110 includes a controller 190. The controller 190 is in communication with the turbine engine 110 for controlling aspects of the turbine engine 110. For example, the controller 190 is in two-way communication with the turbine engine 110 for receiving signals from various sensors (e.g., the speed sensors detailed herein) and control systems of the turbine engine 110 (e.g., the fuel system 180) and for controlling components of the turbine engine 110 (e.g., the fan blades 140), as detailed further below. The controller 190, or components thereof, may be located onboard the turbine engine 110, onboard the aircraft, or can be located remote from each of the turbine engine 110 and the aircraft. The controller 190 can be a Full Authority Digital Engine Control (FADEC) that controls aspects of the turbine engine 110.

The controller 190 may be a standalone controller or may be part of an engine controller to operate various systems of the turbine engine 110. In this embodiment, the controller 190 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 190 to perform operations. The controller 190 and, more specifically, the one or more processors are programmed or configured to perform these operations, such as the operations discussed further below. In some embodiments, the instructions can be executed by the one or more processors to cause the one or more processors to complete any of the operations and functions for which the controller 190 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The turbine engine 110 depicted in FIG. 1 is by way of example only. In other exemplary embodiments, the turbine engine 110 may have other suitable configurations. In other exemplary embodiments, any other suitable number or configuration of compressors, turbines, shafts, or a combination thereof may be provided. In still other exemplary embodiments, aspects of the present disclosure may be incorporated into other suitable turbine engines, such as, for example, propfan (e.g., unducted fan) engines, turboprop engine, or the like.

Figure 2:
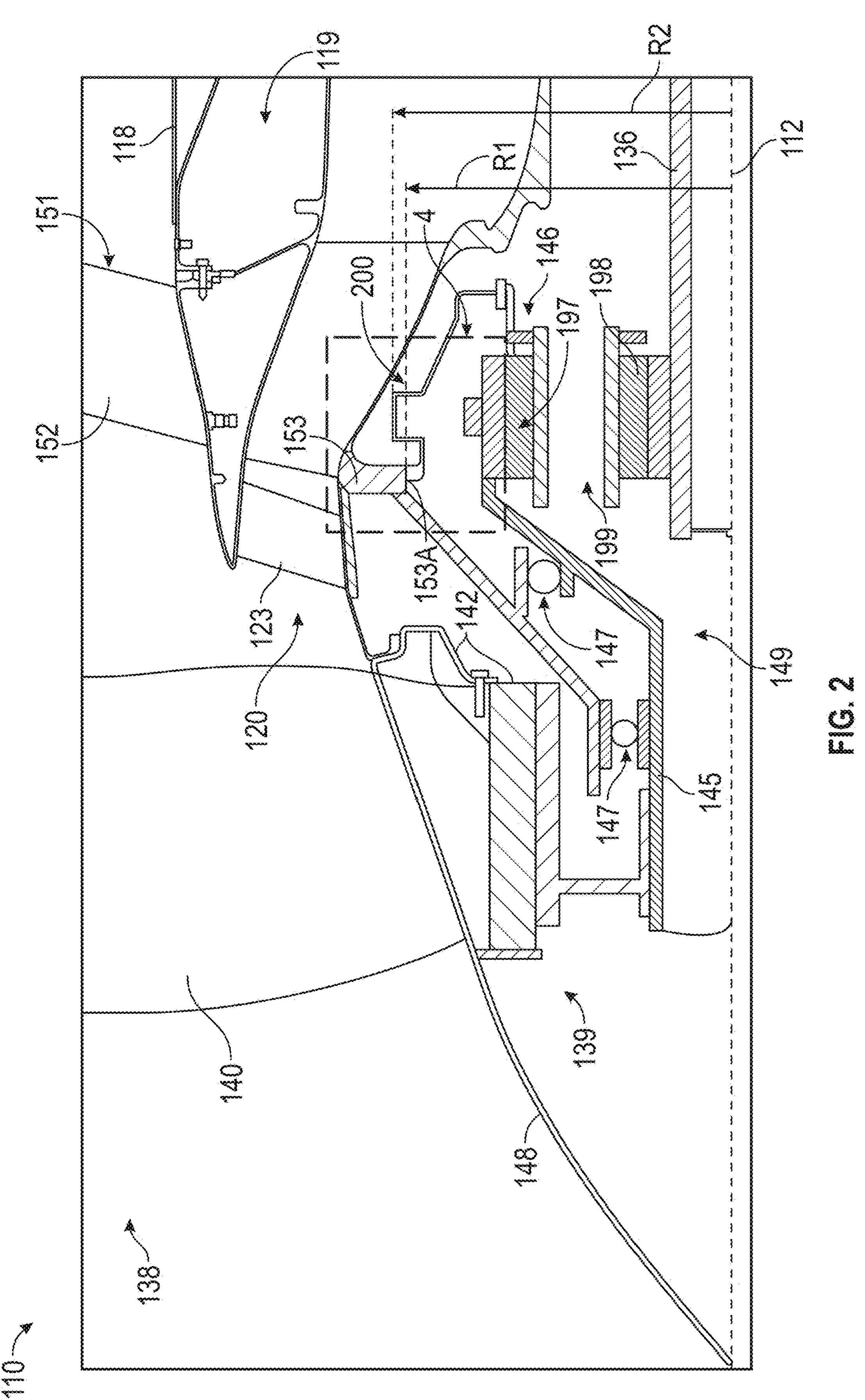
FIG. 2 is a partial schematic cross-sectional view of the turbine engine of FIG. 1, taken at detail 2 in FIG. 1, with a fan speed sensor system, according to the present disclosure.

FIG. 2 is a partial schematic cross-sectional view of the turbine engine 110, taken at detail 2 in FIG. 1, with a scavenge gutter 200, according to the present disclosure. As shown in FIG. 2, the core cowl 118 (also shown in FIG. 1) includes a hollow interior 119. The core inlet 120 includes an inlet guide vane 123 that guides the flow of the core air 164 (FIG. 1) into the turbo-engine 116 (shown in FIG. 1). The fan frame 151 includes a fan frame flange 153. The gearbox assembly 146 (scavenge gearbox) is coupled to the fan frame flange 153 such that the fan frame 151 supports the gearbox assembly 146 via the fan frame flange 153. The fan frame flange 153 also rotationally supports the fan shaft 145 via one or more bearings 147. The turbine engine 110 also includes a lubricant sump 149 that is positioned about the gearbox assembly 146 for collecting lubricant (e.g., oil) that is supplied to the one or more bearings 147 and to the gearbox assembly 146. In particular, the lubricant sump 149 is positioned radially within the fan frame 151. In an embodiment, the lubricant sump 149 is an oil wetted bearing sump. The fan 138 includes a fan rotor assembly 139 that includes the fan disk 142.

The gearbox assembly 146 includes a gearbox 197 having a plurality of gears 198 and the scavenge gutter 200. The scavenge gutter 200 operates as a lubricant collector to collect lubricant that is ejected by the plurality of gears 198 of the gearbox 197 during rotation of the plurality of gears 198. The scavenge gutter 200 is configured to gather and to route lubricant from a gearbox cavity 199 housing the plurality of gears 198 of the gearbox 197 into a collection sump (not shown). The scavenge gutter 200 is located radially outward, with respect to the longitudinal centerline axis 112, of the plurality of gears 198 of the gearbox assembly 146. In addition, the scavenge gutter 200 is also located radially outward of an interface 153A between fan frame flange 153 and the scavenge gutter 200. As shown in FIG. 2, the interface 153A between the fan frame flange 153 and the scavenge gutter 200 is located at a first radial distance R1 relative to the longitudinal centerline axis 112 and the scavenge gutter 200 is located at a second radial distance R2 relative to the longitudinal centerline axis 112. The second radial distance R2 is greater than the first radial distance R1. By providing the scavenge gutter 200 radially outward of the interface 153A between the fan frame flange 153 and the scavenge gutter 200, the scavenge gutter 200 is the outer most portion of the gearbox assembly 146. The scavenge gutter 200 may set the airflow path minimum radius allowable through the fan frame into the turbo-engine 116 of the turbine engine 110 (shown in FIG. 1). Therefore, the radial position of the scavenge gutter 200 may impact the radius ratio of the fan hub 148 that may impact fan aerodynamic efficiency and, ultimately, impact the diameter of the fan 138 (shown in FIG. 1). Hence, positioning the scavenge gutter 200 radially outward of the fan frame flange 153, allows providing more space for the gearbox assembly 146 and associated scavenge gutter 200 while reducing the radius of the fan hub 148, and ultimately, reducing the diameter of the fan 138.

In an embodiment, the scavenge gutter 200 can have an annular shape. In an embodiment, the scavenge gutter 200 may be segmented.

Figure 3A:
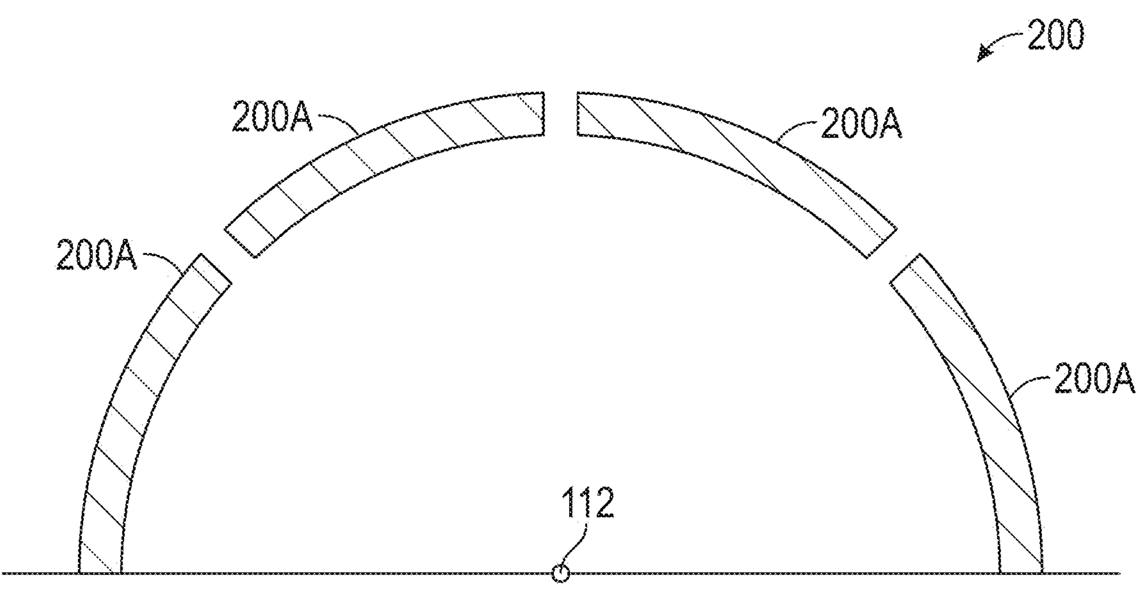
FIG. 3A is a schematic cross-sectional view of an upper half of a scavenge gutter of a gearbox assembly of the turbine engine, according to an embodiment of the present invention.

FIG. 3A is a schematic cross-sectional view of an upper half of the scavenge gutter 200, according to an embodiment of the present invention. In an embodiment, as shown in FIG. 3A, the scavenge gutter 200 is annular and is segmented in the circumferential direction around the longitudinal centerline axis 112 into a first plurality of sector portions 200A. In another embodiment, the scavenge gutter 200 is annular and is segmented in a longitudinal direction along the longitudinal centerline axis. The first plurality of sector portions 200A of the scavenge gutter 200 are assembled to form the scavenge gutter 200, as will be further described below. Only the upper half of the scavenge gutter 200 is shown in FIG. 3A. However, the lower half portion of the scavenge gutter 200 is similar to the upper half of the scavenge gutter 200. By segmenting the scavenge gutter 200, it is possible to package the airflow path more tightly to the gearbox assembly 146, thus improving fan aerodynamic efficiency, lowering fan diameter, and improving booster performance (due to booster radius ratio). For example, this can be achieved by any number of the first plurality of sector portions 200A that may be installed into the fan frame 151 prior to the rest of gearbox assembly 146 being installed into the fan frame 151 (shown in FIG. 2).

Figure 3B:
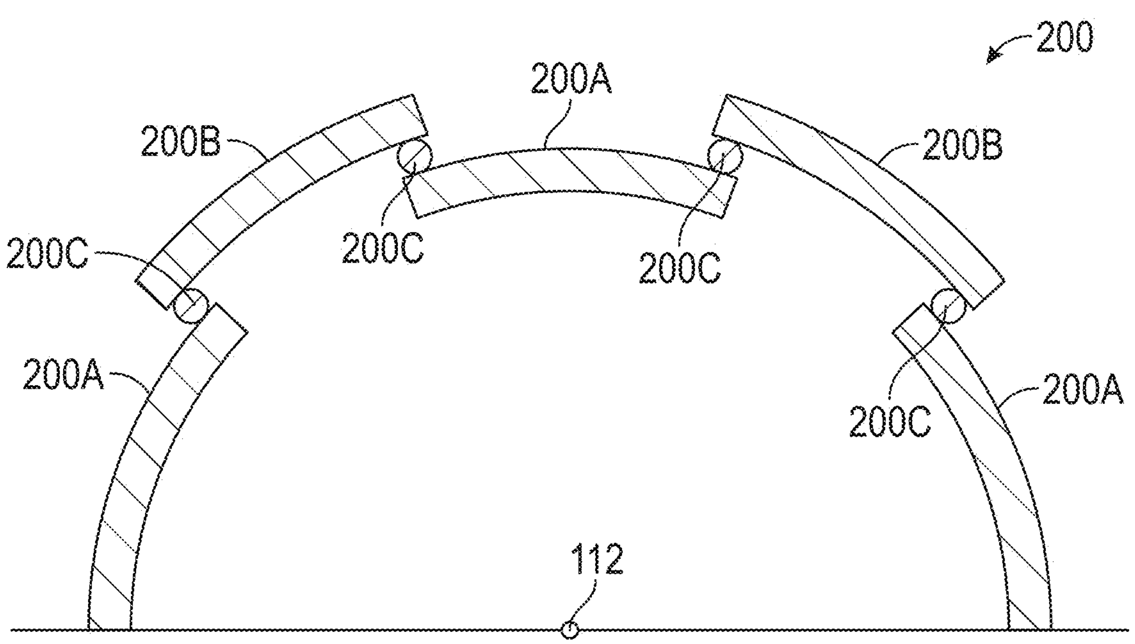
FIG. 3B is a schematic cross-sectional view of an upper half of the scavenge gutter, according to another embodiment of the present invention.

FIG. 3B is a schematic cross-sectional view of an upper half of the scavenge gutter 200, according to another embodiment of the present invention. In an embodiment, as shown in FIG. 3B, the scavenge gutter 200 is annular and is segmented in the circumferential direction around the longitudinal centerline axis 112 into a first plurality of sector portions 200A and a second plurality of sector portions 200B. The first plurality of sector portions 200A and the second plurality of sector portions 200B of the scavenge gutter 200 are joined together to form the scavenge gutter 200. The second plurality of sector portions 200B of the scavenge gutter 200 are in contact with the first plurality of sector portions 200A of the scavenge gutter 200 via a plurality of sealing members 200C. The first plurality of sector portions 200A of the scavenge gutter 200 and the second plurality of sector portions of the scavenge gutter 200 are alternated, as shown in FIG. 3B, to form the scavenge gutter 200 having an annular shape. The first plurality of sector portions 200A are overlapping with the second plurality of sector portions 200B and the sealing members 200C are provided between overlapping portions of the first plurality of sector portions 200A and the second plurality of sector portions 200B. Only the upper half of the scavenge gutter 200 is shown in FIG. 3B. However, the lower half portion of the scavenge gutter 200 is similar to the upper half of the scavenge gutter 200.

Figure 4:
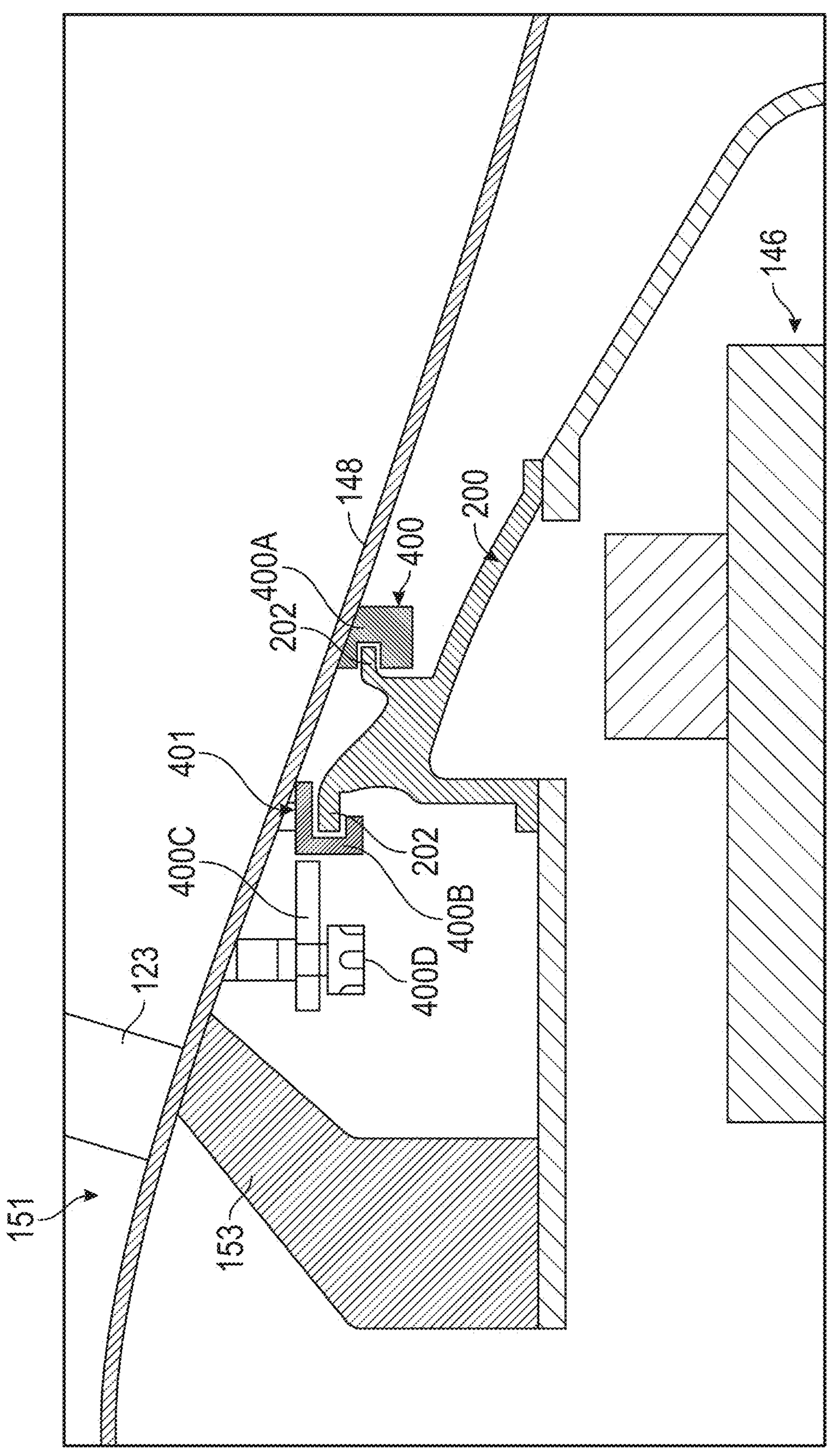
FIG. 4 is a partial schematic cross-sectional view of the turbine engine, taken at detail 4 in FIG. 2, showing a portion of the scavenge gutter segmented in the circumferential direction, according to an embodiment of the present disclosure.

FIG. 4 is a partial schematic cross-sectional view of the turbine engine 110, taken at detail 4 in FIG. 2, showing a portion of the scavenge gutter 200 of the gearbox assembly 146 segmented in the circumferential direction, according to an embodiment of the present disclosure. As shown in FIG. 4, the gearbox assembly 146 further includes a mounting assembly 400 for mounting the scavenge gutter 200 to the fan frame 151. The mounting assembly 400 includes a first plurality of fastener segments 400A (e.g., C-clip segments) that are connected to the fan frame 151 and a second plurality of fastener segments 400B that are not connected to the fan frame 151. The scavenge gutter 200 has a plurality of arms 202 that are configured to mate with the first plurality of fastener segments 400A and the second plurality of fastener segments 400B of the mounting assembly 400. As shown in FIG. 4, the scavenge gutter 200 having the arms 202 forms an "H-shape." However, other shapes are also possible. The mounting assembly 400 may also include a stopper 400C configured to exert a force on the second plurality of fastener segments 400B to tighten the second plurality of fastener segments 400B against the one or more of the plurality of arms 202, once the plurality of arms 202 of the scavenge gutter 200 are mounted to the plurality of fastener segments 400A. The stopper 400C is connected to fan frame 151 using one or more fasteners 400D.

In another embodiment, the mounting assembly 400 may not be used. In this case the scavenge gutter 200 may be provided as an integral part of the fan frame 151.

Figure 5:
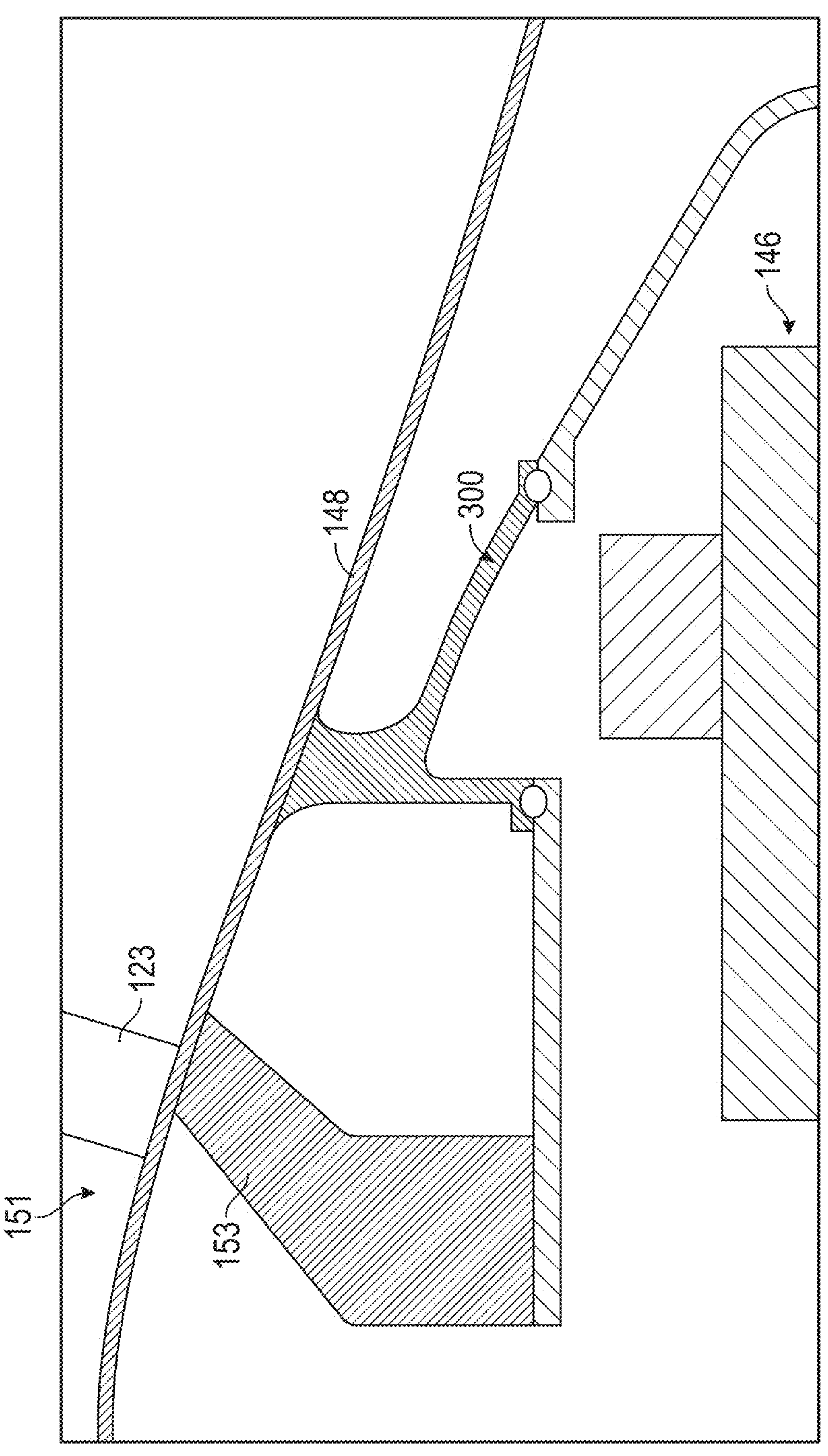
FIG. 5 is a partial schematic cross-sectional view of the turbine engine showing a portion of a scavenge gutter, according to another embodiment of the present disclosure.

FIG. 5 is a partial schematic cross-sectional view of the turbine engine 110, in FIG. 2, showing a portion of a scavenge gutter 300 of the gearbox assembly 146, according to another embodiment of the present disclosure. As shown in FIG. 5, the scavenge gutter 300 is an integral part of the fan frame 151. For example, the scavenge gutter 300 may be formed from a same material as one part of the fan frame 151. As shown in FIG. 5, the scavenge gutter 300 can have an inverted "V-shape" wherein the vertex of the "V-shape" is connected to the fan frame 151.

Figure 6:
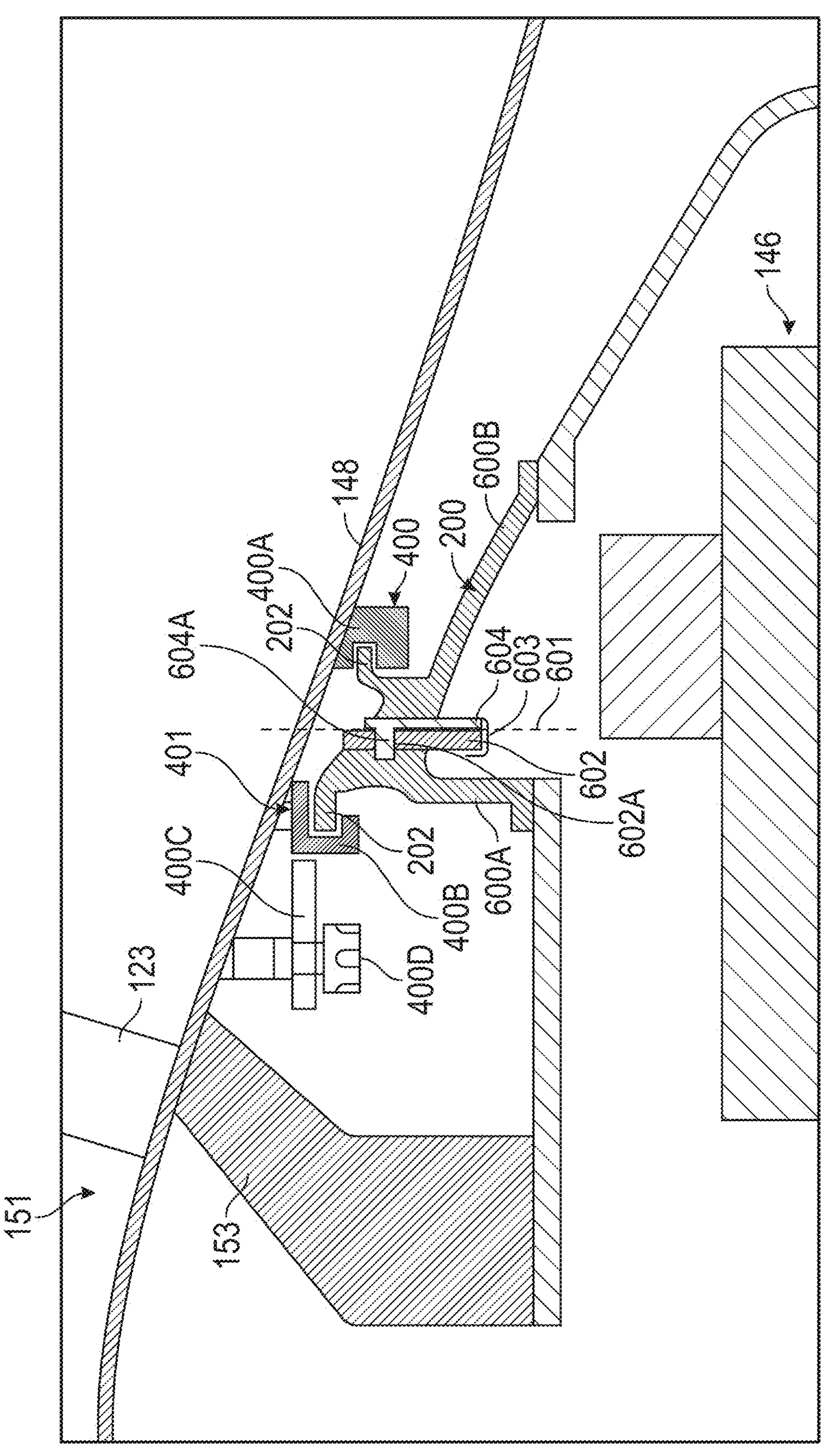
FIG. 6 is a partial schematic cross-sectional view of the turbine engine showing a portion of the scavenge gutter of the gearbox assembly segmented in the longitudinal direction, according to another embodiment of the present disclosure.

FIG. 6 is a partial schematic cross-sectional view of the turbine engine 110 showing a portion of the scavenge gutter 200 of the gearbox assembly 146 segmented in the longitudinal direction, according to another embodiment of the present disclosure. This embodiment is similar, in some respects, to the embodiment shown in FIG. 4. Therefore, the same reference numerals are used in FIG. 6 to indicate the same components. In the embodiment shown in FIG. 4, the scavenge gutter 200 is annular and is segmented in the circumferential direction around the longitudinal centerline axis 112 into a first plurality of sector portions 200A and a second plurality of sector portions 200B, as shown in FIGS. 3A and 3B. In the embodiment shown in FIG. 6, the scavenge gutter 200 is annular and is segmented in a longitudinal direction along the longitudinal centerline axis 112 (shown in FIG. 2). For example, as shown in FIG. 6, the scavenge gutter 200 is split into a plurality of longitudinal segments, and, particularly, a first longitudinal segment 600A and a second longitudinal segment 600B, along a split line 601. The first longitudinal segment 600A of the scavenge gutter 200 is provided with a first attachment element 602. The first attachment element 602 has a groove 602A. The second longitudinal segment 600B of the scavenge gutter 200 is provided with a second attachment element 604. The second attachment element 604 has a tongue 604A. The tongue 604A is configured to mate with the groove 602A so as to connect the second attachment element 604 to the first attachment element 602 and, thus, to connect the second longitudinal segment 600B to the first longitudinal segment 600A in the longitudinal direction along the longitudinal centerline axis 112 (shown in FIG. 2). A fastener 603 (e.g., a C-clip) may optionally be used to fasten the first attachment element 602 to the second attachment element 604.

Figure 7A:
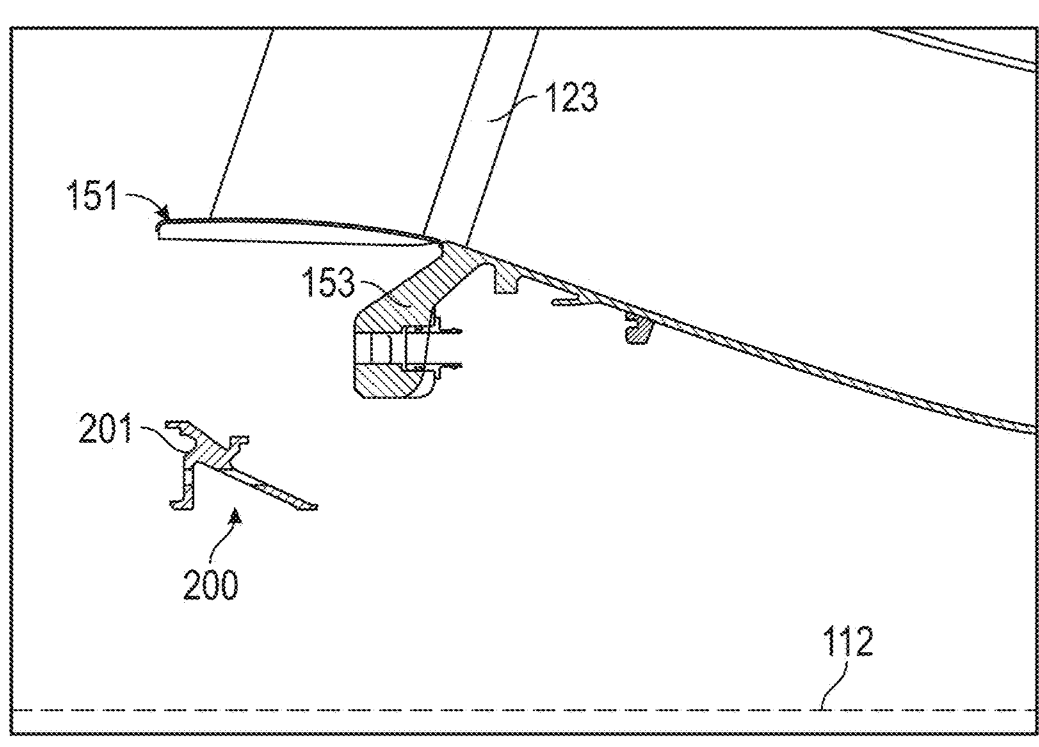
FIGS. 7A to 7H are partial schematic cross-sectional views of the turbine engine taken at various phases of mounting the scavenge gutter to a fan hub of the turbine engine, according to an embodiment of the present disclosure.
Figure 7B:
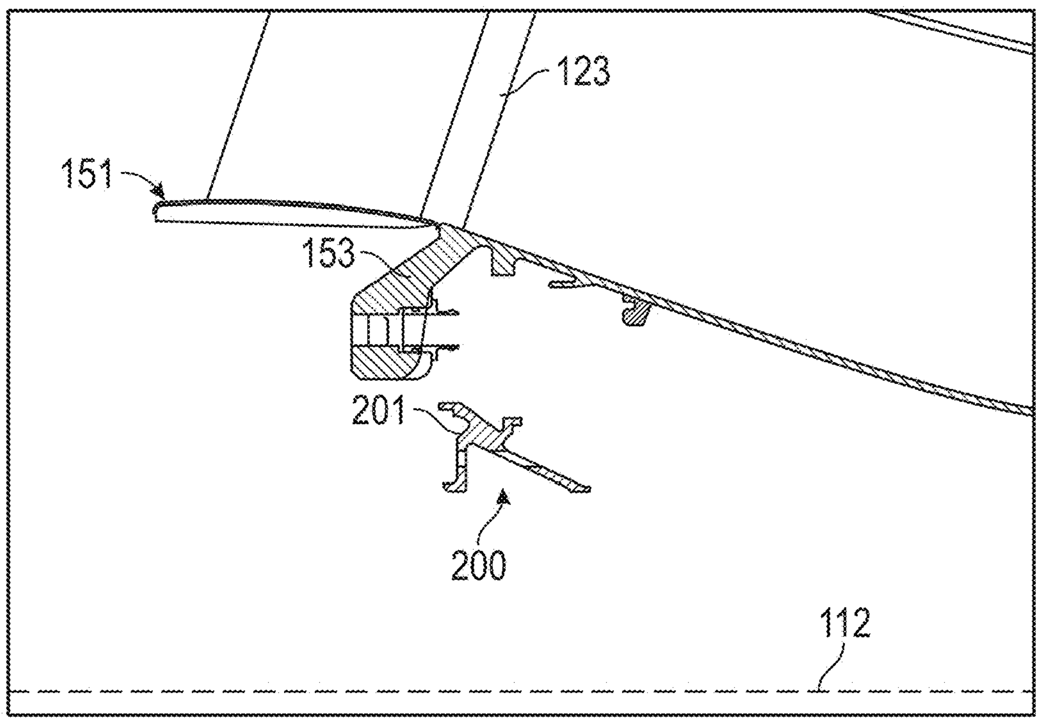
Figure 7C:
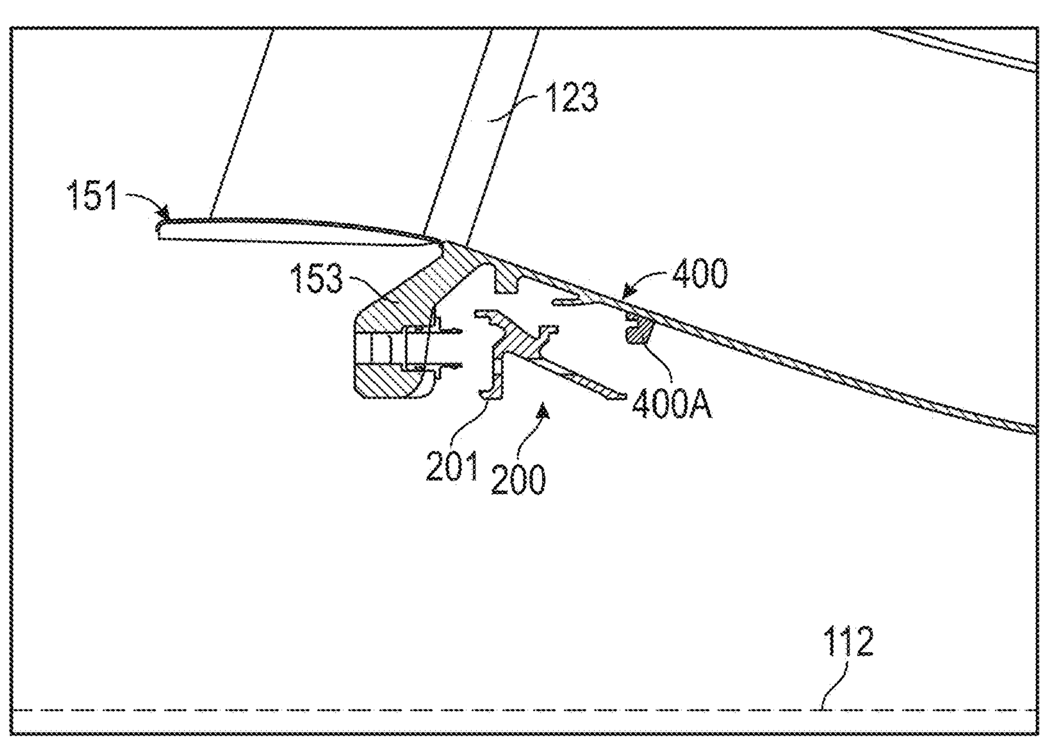
Figure 7D:
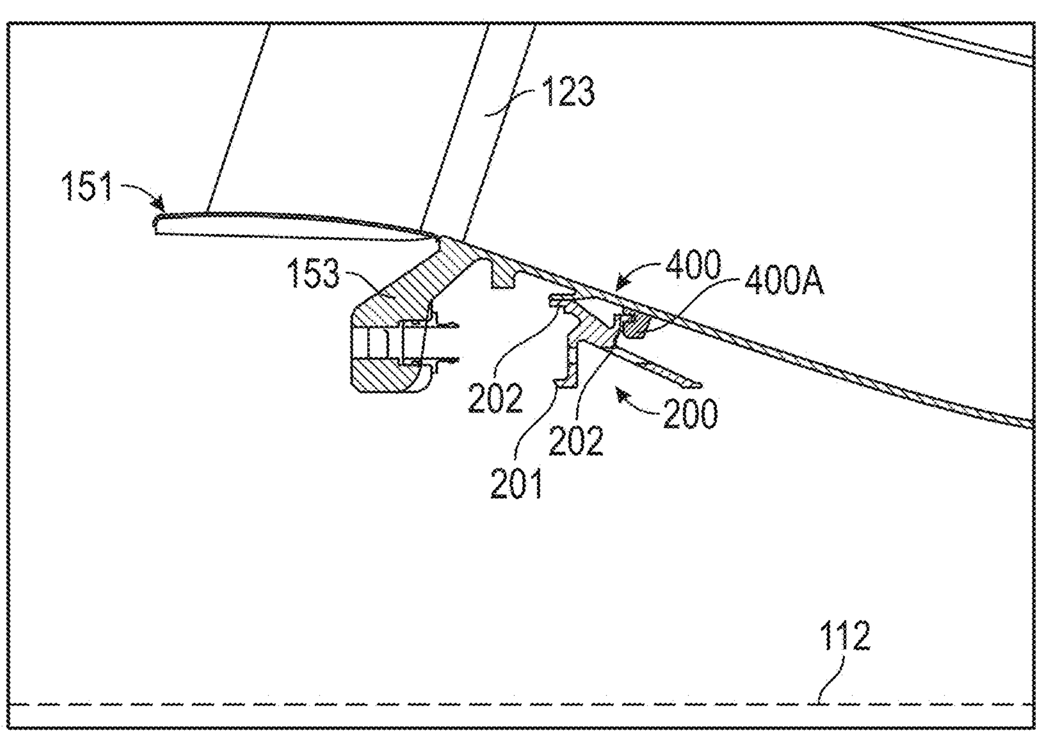
Figure 7E:
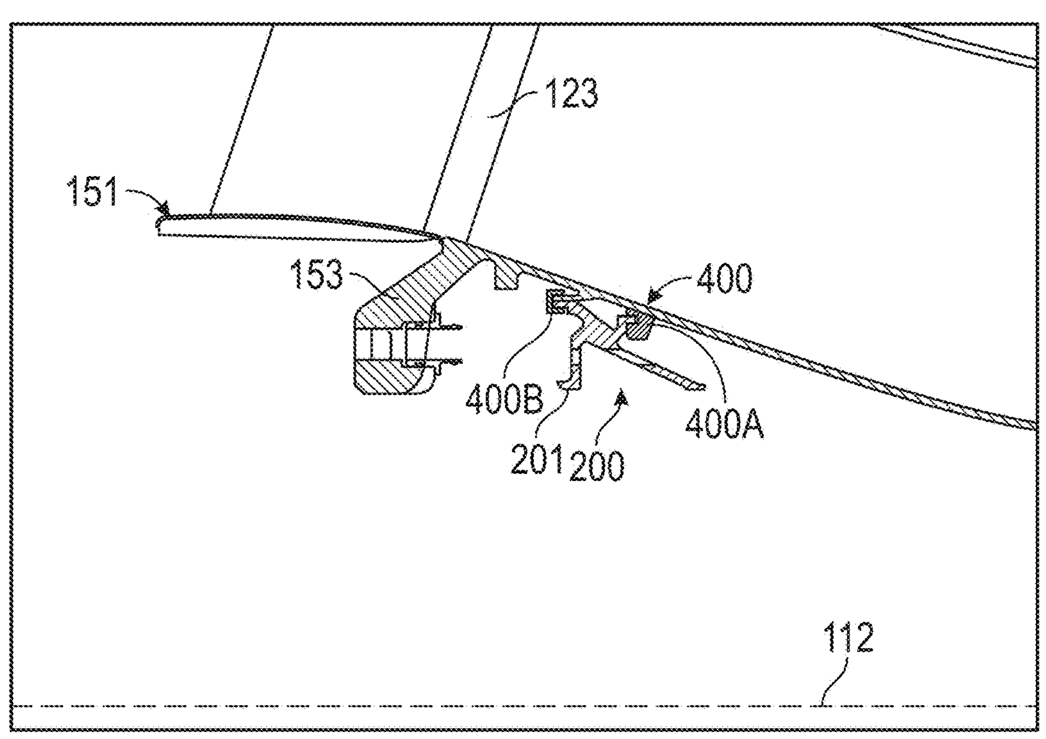
Figure 7F:
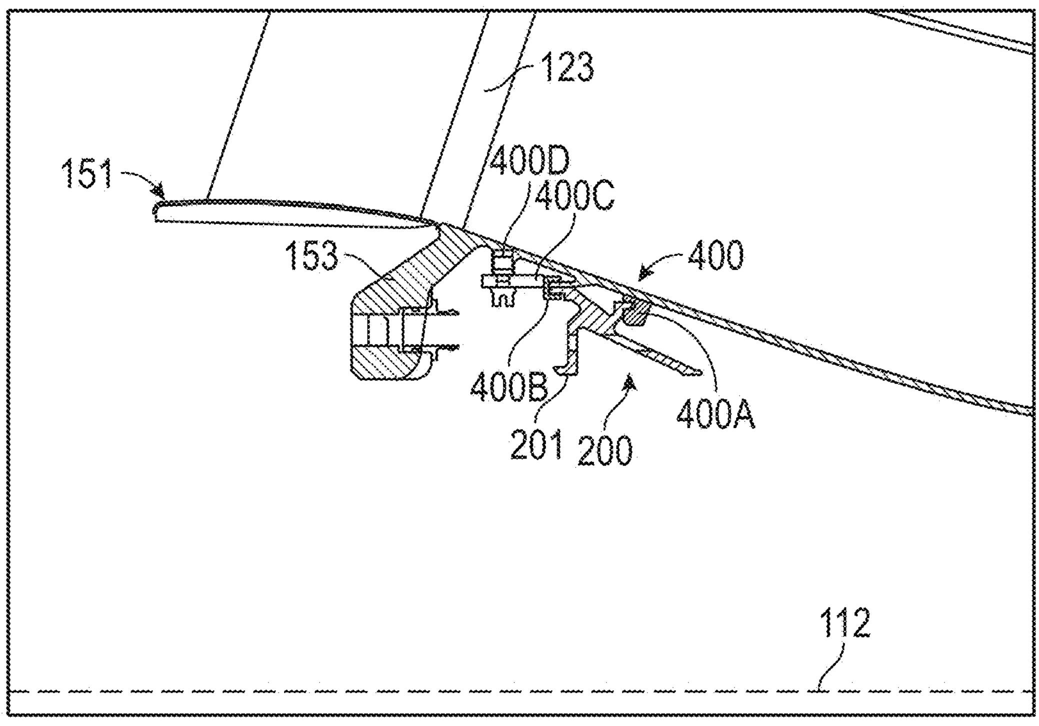

FIGS. 7A to 7H are partial schematic cross-sectional views of the turbine engine 110 taken at various phases of mounting the scavenge gutter 200 to the fan frame 151, according to an embodiment of the present disclosure. FIGS. 7A to 7H show an assembly story board of the scavenge gutter 200 to the fan frame 151. Initially, a first sector portion 201 of the scavenge gutter 200 is passed between the longitudinal centerline axis 112 and the fan frame flange 153 (e.g., in the illustrated example, below the fan frame flange 153), as shown in FIGS. 7A and 7B. The first sector portion 201 of the scavenge gutter 200 is then brought closer to the first plurality of fastener segments 400A of the mounting assembly 400, as shown in FIG. 7C. The first sector portion 201 of the scavenge gutter 200 is then mounted to the first plurality of fastener segments 400A of the mounting assembly 400 by mating the plurality of arms 202 of the first sector portion 201 of the scavenge gutter 200 with the first plurality of fastener segments 400A, as shown in FIG. 7D and FIG. 7E. After mounting the plurality of arms 202 of the first sector portion 201 of the scavenge gutter 200 to the first plurality of fastener segments 400A, the stopper 400C is used to lock the second plurality of fastener segments 400B against the plurality of arms 202 so as to prevent the first sector portion 201 of the scavenge gutter 200 from disconnecting from the mounting assembly 400, as shown in FIG. 7F.

A second sector portion (not shown) of the scavenge gutter 200 is passed between the fan frame flange 153 and the longitudinal centerline axis 112, as shown in FIGS. 7A and 7B. The second sector portion of the scavenge gutter 200 can be similar the first sector portion 201 of the scavenge gutter 200. For example, the first sector portion 201 can be one of the first plurality of sector portions 200A or one of the second plurality of sector portions 200B (shown in FIGS. 3A and 3B). For example, the second sector portion (not shown) can be one of the first plurality of sector portions 200A or one of the second plurality of sector portions 200B (shown in FIGS. 3A and 3B). The second sector portion is not shown in FIGS. 7A to 7H, but a similar mounting procedure as the mounting procedure described above with respect to the first sector portion 201 can be employed for mounting the second sector portion (not shown). Therefore, in describing the procedure for mounting the second sector portion (not shown) reference will be made to the same FIGS. 7A to 7H. The second sector portion of the scavenge gutter 200 is brought closer to the first plurality fastener segments 400A of the mounting assembly 400, as shown in FIG. 7C. The second sector portion of the scavenge gutter 200 is then mounted to the first plurality of fastener segments 400A of the mounting assembly 400 by mating the plurality of arms 202 of the second sector portion of the scavenge gutter 200 with the first plurality of fastener segments 400A, as shown in FIG. 7D and FIG. 7E. After mounting the plurality of arms 202 of the second sector portion of the scavenge gutter 200 to the first plurality of fastener segments 400A, the stopper 400C is used to lock the second plurality of fastener segments 400B against the plurality of arms 202 so as to prevent the second sector portion of the scavenge gutter 200 from disconnecting from the mounting assembly 400, as shown in FIG. 7F. This process is repeated a plurality of times until all sector portions of the scavenge gutter 200 are mounted to form the scavenge gutter 200 having an annular shape. After mounting all sector portions, the scavenge gutter 200 can have a configuration similar to the configuration shown in FIG. 3A, or a configuration similar to the configuration shown in FIG. 3B.

Figure 7G:
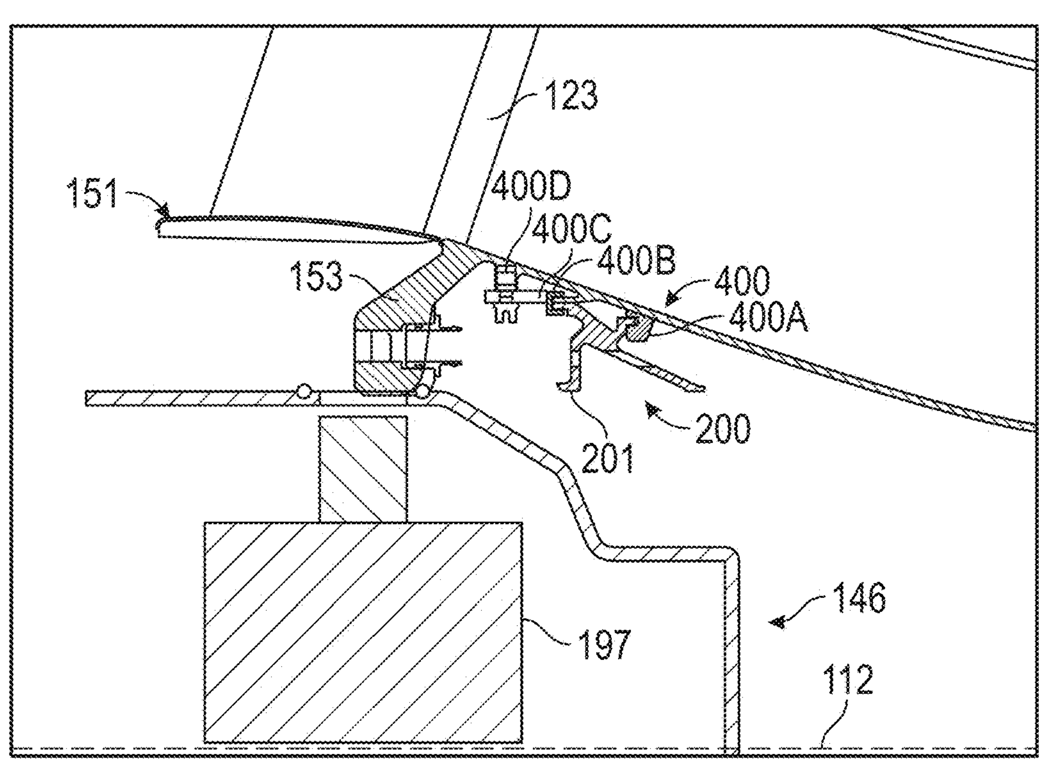
Figure 7H:
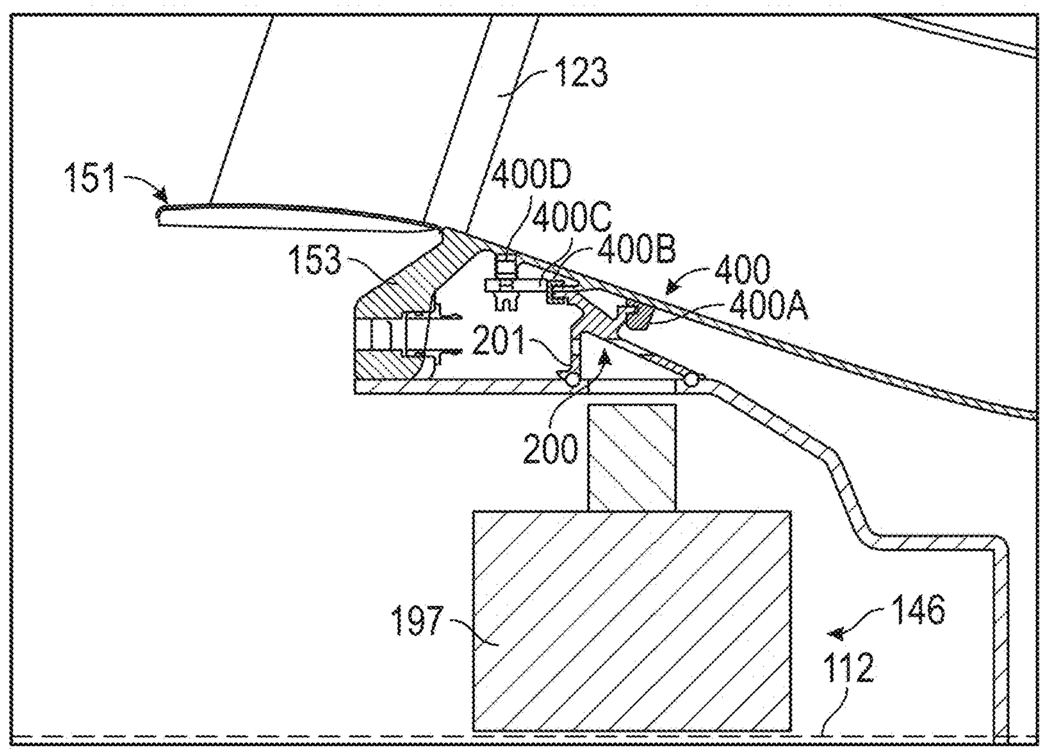

The gearbox 197 having the plurality of gears 198 (FIG. 2) of the gearbox assembly 146 is then passed between the fan frame flange 153 and the longitudinal centerline axis 112 (e.g., under the fan frame flange 153), as shown in FIG. 7G. The gearbox 197 of the gearbox assembly 146 is then brought in contact with the scavenge gutter 200, as shown in FIG. 7H, and then coupled to the fan frame flange 153 such that the fan frame 151 supports the gearbox assembly 146 via the fan frame flange 153, as shown in FIG. 2. Therefore, by segmenting the scavenge gutter 200 into a plurality of sector portions, the mounting of the scavenge gutter 200 is facilitated. In the above embodiment, the gearbox 197 of the gearbox assembly 146 is passed between the fan frame flange 153 and the longitudinal centerline axis of 112 (e.g., under the fan frame flange 153) and is mounted to the fan frame flange 153 after mounting the plurality of sector portions of the scavenge gutter 200. In another embodiment, the gearbox 197 of the gearbox assembly 146 is passed between the fan frame flange 153 and the longitudinal centerline axis 112 (e.g., under the fan frame flange 153) and is mounted to the fan frame 151, prior to mounting the plurality of sector portions of the scavenge gutter 200.

Further aspects are provided by the subject matter of the following clauses.

A gearbox assembly for a turbine engine, the gearbox assembly including a gearbox having a plurality of gears, and a scavenge gutter radially outward of the gearbox and mounted to a fan frame flange of a fan frame of the turbine engine, the scavenge gutter being configured to collect lubricant that is ejected by the plurality of gears of the gearbox during rotation of the plurality of gears. An interface between the fan frame flange and the scavenge gutter is located at a first radial distance R1 relative to a longitudinal centerline axis of the turbine engine and the scavenge gutter is located at a second radial distance R2 relative to the longitudinal centerline axis, the second radial distance R2 is greater than the first radial distance R1. The scavenge gutter is segmented and includes a plurality of sector portions joined together to form the scavenge gutter.

The gearbox assembly of the preceding clause, wherein the scavenge gutter is annular and is segmented in a circumferential direction around the longitudinal centerline axis.

The gearbox assembly of any preceding clause, wherein the scavenge gutter is annular and is segmented in a longitudinal direction along the longitudinal centerline axis.

The gearbox assembly of any preceding clause, wherein the scavenge gutter is an integral part of the fan frame.

The gearbox assembly of any preceding clause, wherein the scavenge gutter is formed from a same material as the fan frame.

The gearbox assembly of any preceding clause, wherein the plurality of sector portions includes a first plurality of sector portions and a second plurality of sector portions, the first plurality of sector portions and the second plurality of sector portions are joined together to form the scavenge gutter, the first plurality of sector portions are alternated with the second plurality of sector portions, and the first plurality of sector portions are in contact with the second plurality of sector portions via a plurality of sealing members.

The gearbox assembly of any preceding clause, wherein the first plurality of sector portions are overlapping with the second plurality of sector portions and the sealing members are provided between overlapping portions of the first plurality of sector portions and the second plurality of sector portions.

The gearbox assembly of any preceding clause, further including a mounting assembly configured to mount the scavenge gutter to the fan frame.

The gearbox assembly of any preceding clause, wherein the mounting assembly includes a first plurality of fastener segments that are connected to the fan frame, a second plurality of fastener segments that are not connected to the fan frame, and a stopper configured to apply a force on the second plurality of fastener segments so as to prevent the scavenge gutter from disconnecting from the mounting assembly.

The gearbox assembly of any preceding clause, wherein the scavenge gutter has a plurality of arms that are configured to mate the first plurality of fastener segments and the second plurality of fastener segments.

The gearbox assembly of any preceding clause, wherein the stopper is configured to apply a force on the second plurality of fastener segments against one or more of the plurality of arms.

The gearbox assembly of any preceding clause, wherein the scavenge gutter comprises a plurality of longitudinal segments.

The gearbox assembly of any preceding clause, wherein the scavenge gutter comprises a first longitudinal segment and a second longitudinal segment.

The gearbox assembly of any preceding clause, wherein the first longitudinal segment of the scavenge gutter is provided with a first attachment element having a groove.

The gearbox assembly of any preceding clause, wherein the second longitudinal segment of the scavenge gutter is provided with a second attachment element having a tongue.

The gearbox assembly of any preceding clause, wherein the tongue is configured to mate with the groove so as to connect the second attachment element to the first attachment element and to connect the second longitudinal segment to the first longitudinal segment in a longitudinal direction along the longitudinal centerline axis.

The gearbox assembly of any preceding clause, further comprising a fastener configured to fasten the first attachment element to the second attachment element.

A turbine engine including a fan frame and a fan frame flange connected to the fan frame, and a gearbox assembly including a gearbox having a plurality of gears, and a scavenge gutter radially outward of the gearbox and mounted to the fan frame flange, the scavenge gutter being configured to collect lubricant that is ejected by the plurality of gears of the gearbox during rotation of the plurality of gears. An interface between the fan frame flange and the scavenge gutter is located at a first radial distance R1 relative to a longitudinal centerline axis of the turbine engine and the scavenge gutter is located at a second radial distance R2 relative to the longitudinal centerline axis, the second radial distance R2 is greater than the first radial distance R1, and the scavenge gutter is segmented and includes a plurality of sector portions joined together to form the scavenge gutter.

The turbine engine of the preceding clause, wherein the scavenge gutter is annular and is segmented in a circumferential direction around the longitudinal centerline axis.

The turbine engine of any preceding clause, wherein the scavenge gutter is annular and is segmented in a longitudinal direction along the longitudinal centerline axis.

The turbine engine of any preceding clause, wherein the scavenge gutter is an integral part of the fan frame.

The turbine engine of any preceding clause, wherein the scavenge gutter is formed from a same material as the fan frame.

The turbine engine of any preceding clause, wherein the plurality of sector portions includes a first plurality of sector portions and a second plurality of sector portions, the first plurality of sector portions and the second plurality of sector portions are joined together to form the scavenge gutter, the first plurality of sector portions are alternated with the second plurality of sector portions, and the first plurality of sector portions are in contact with the second plurality of sector portions via a plurality of sealing members.

The turbine engine of any preceding clause, wherein the first plurality of sector portions are overlapping with the second plurality of sector portions and the sealing members are provided between overlapping portions of the first plurality of sector portions and the second plurality of sector portions.

The turbine engine of any preceding clause, further including a mounting assembly configured to mount the scavenge gutter to the fan frame.

The turbine engine of any preceding clause, wherein the mounting assembly includes a first plurality of fastener segments that are connected to the fan frame, a second plurality of fastener segments that are not connected to the fan frame, and a stopper configured to apply a force on the second plurality of fastener segments so as to prevent the scavenge gutter from disconnecting from the mounting assembly.

The turbine engine of any preceding clause, wherein the scavenge gutter has a plurality of arms that are configured to mate the first plurality of fastener segments and the second plurality of fastener segments.

The turbine engine of any preceding clause, wherein the stopper is configured to apply a force on the second plurality of fastener segments against one or more of the plurality of arms.

The turbine engine of any preceding clause, wherein the scavenge gutter comprises a plurality of longitudinal segments.

The turbine engine of any preceding clause, wherein the scavenge gutter comprises a first longitudinal segment and a second longitudinal segment.

The turbine engine of any preceding clause, wherein the first longitudinal segment of the scavenge gutter is provided with a first attachment element having a groove.

The turbine engine of any preceding clause, wherein the second longitudinal segment of the scavenge gutter is provided with a second attachment element having a tongue.

The turbine engine of any preceding clause, wherein the tongue is configured to mate with the groove so as to connect the second attachment element to the first attachment element and to connect the second longitudinal segment to the first longitudinal segment in a longitudinal direction along the longitudinal centerline axis.

The turbine engine of any preceding clause, further comprising a fastener configured to fasten the first attachment element to the second attachment element.

A method of mounting a gearbox assembly having a gearbox and a scavenge gutter to a fan frame flange of a turbine, the method including passing a first sector portion of the scavenge gutter of the gearbox assembly between the fan frame flange and a longitudinal centerline axis of the turbine, mounting the first sector portion of the scavenge gutter to a plurality of fastener segments of a mounting assembly, passing a second sector portion of the scavenge gutter of the gearbox assembly between the fan frame flange and the longitudinal centerline axis of the turbine, mounting the second sector portion of the scavenge gutter to the plurality of fastener segments of the mounting assembly, passing the gearbox of the gearbox assembly between the fan frame flange and the longitudinal centerline axis of the turbine, and mounting the gearbox to the fan frame flange to support the gearbox.

The method of the preceding clause, further including repeating mounting the first sector portion of the scavenge gutter and mounting the second sector portion of the scavenge gutter, until all sector portions of the scavenge gutter are mounted.

The method of any preceding clause, further including mounting the first sector portion of the scavenge gutter and mounting the second sector portion of the scavenge gutter, prior to mounting the gearbox to the fan frame flange.

The method of any preceding clause, further including mounting the first sector portion of the scavenge gutter and mounting the second sector portion of the scavenge gutter, after mounting the gearbox to the fan frame flange.

The method of any preceding clause, wherein mounting the first sector portion of the scavenge gutter to the plurality of fastener segments includes mating a plurality of arms of the first sector portion of the scavenge gutter to the plurality of fastener segments.

The method of any preceding clause, further including locking one or more of the plurality of fastener segments against the one or more of the plurality of arms using a stopper so as to prevent the first sector portion of the scavenge gutter from disconnecting from the mounting assembly.

The method of any preceding clause, wherein mounting the second sector portion of the scavenge gutter to the plurality of fastener segments includes mating a plurality of arms of the second sector portion of the scavenge gutter to the plurality of fastener segments.

The method of any preceding clause, further including locking one or more of the plurality of fastener segments against the one or more of the plurality of arms using a stopper so as to prevent the second sector portion of the scavenge gutter from disconnecting from the mounting assembly.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A gearbox assembly for a turbine engine, the gearbox assembly comprising:

- a gearbox having a plurality of gears; and
- a scavenge gutter radially outward of the gearbox and mounted to a fan frame flange of a fan frame of the turbine engine, the scavenge gutter being configured to collect lubricant that is ejected by the plurality of gears of the gearbox during rotation of the plurality of gears,
- wherein an interface between the fan frame flange and the scavenge gutter is located at a first radial distance R1 relative to a longitudinal centerline axis of the turbine engine and the scavenge gutter is located at a second radial distance R2 relative to the longitudinal centerline axis, the second radial distance R2 is greater than the first radial distance R1, and
- wherein the scavenge gutter is segmented and comprises a plurality of sector portions joined together in a circumferential direction to form the scavenge gutter.

2. The gearbox assembly of claim 1, wherein the scavenge gutter is annular and is segmented in the circumferential direction around the longitudinal centerline axis.

3. The gearbox assembly of claim 1, wherein the plurality of sector portions comprises a first plurality of sector portions and a second plurality of sector portions, the first plurality of sector portions and the second plurality of sector portions are joined together to form the scavenge gutter, the first plurality of sector portions are alternated with the second plurality of sector portions, and the first plurality of sector portions are in contact with the second plurality of sector portions via a plurality of sealing members.

4. The gearbox assembly of claim 3, wherein the first plurality of sector portions are overlapping with the second plurality of sector portions and the sealing members are provided between overlapping portions of the first plurality of sector portions and the second plurality of sector portions.

5. The gearbox assembly of claim 1, further comprising a mounting assembly configured to mount the scavenge gutter to the fan frame.

6. The gearbox assembly of claim 5, wherein the mounting assembly comprises a first plurality of fastener segments that are connected to the fan frame, a second plurality of fastener segments that are not connected to the fan frame, and a stopper configured to apply a force on the second plurality of fastener segments so as to prevent the scavenge gutter from disconnecting from the mounting assembly.

7. The gearbox assembly of claim 6, wherein the scavenge gutter has a plurality of arms that are configured to mate to the first plurality of fastener segments and the second plurality of fastener segments.

8. The gearbox assembly of claim 7, wherein the stopper is configured to apply a force on the second plurality of fastener segments against one or more of the plurality of arms.

9. A turbine engine comprising:

- a fan frame and a fan frame flange connected to the fan frame; and
- a gearbox assembly comprising:
  - a gearbox having a plurality of gears; and
  - a scavenge gutter radially outward of the gearbox and mounted to the fan frame flange, the scavenge gutter being configured to collect lubricant that is ejected by the plurality of gears of the gearbox during rotation of the plurality of gears,
  - wherein an interface between the fan frame flange and the scavenge gutter is located at a first radial distance R1 relative to a longitudinal centerline axis of the turbine engine and the scavenge gutter is located at a second radial distance R2 relative to the longitudinal centerline axis, the second radial distance R2 is greater than the first radial distance R1, and
  - wherein the scavenge gutter is segmented and comprises a plurality of sector portions joined together in a circumferential direction to form the scavenge gutter.

* * * * *